(12) United States Patent
Gauler

(10) Patent No.: US 7,393,197 B2
(45) Date of Patent: Jul. 1, 2008

(54) INJECTION MOLDING MACHINE HAVING A SIDE-INJECTION SUB-ASSEMBLY AND A METHOD FOR ACCESSING A HOT PASSAGE DISTRIBUTOR SYSTEM CONTAINED THEREIN

(75) Inventor: Kurt Gauler, Rodermark (DE)

(73) Assignee: Incoe Corporation, Troy, MI (US)

( * ) Notice: Subject to any disclaimer, the term of this patent is extended or adjusted under 35 U.S.C. 154(b) by 488 days.

(21) Appl. No.: 10/684,691

(22) Filed: Oct. 14, 2003

(65) Prior Publication Data
US 2005/0077654 A1 Apr. 14, 2005

(51) Int. Cl.
B29C 33/44 (2006.01)
B29C 45/40 (2006.01)

(52) U.S. Cl. .............................. 425/139; 425/436 RM; 425/556

(58) Field of Classification Search ................. 425/183, 425/185, 186, 190, 556, 436 RM
See application file for complete search history.

(56) References Cited
U.S. PATENT DOCUMENTS

| | | | | |
|---|---|---|---|---|
| 4,348,165 A | * | 9/1982 | Vostrovsky | 425/185 |
| 4,500,274 A | * | 2/1985 | Cyriax et al. | 425/185 |
| 4,828,478 A | * | 5/1989 | Hehl | 425/190 |
| 5,219,593 A | * | 6/1993 | Schmidt et al. | 425/549 |
| 5,302,105 A | * | 4/1994 | Bertleff | 425/190 |
| 5,308,234 A | * | 5/1994 | Nicke et al. | 425/188 |
| 5,738,883 A | * | 4/1998 | Tanaka | 425/190 |
| 5,952,016 A | * | 9/1999 | Gellert | 425/190 |
| 6,540,499 B2 | * | 4/2003 | Schneider | 425/190 |
| 6,805,827 B2 | * | 10/2004 | Kami et al. | 264/328.1 |
| 6,921,256 B2 | * | 7/2005 | Bokich | 425/190 |

* cited by examiner

Primary Examiner—James R Mackey
Assistant Examiner—Emmanuel S Luk
(74) Attorney, Agent, or Firm—John A. Artz; Dickinson Wright PLLC

(57) ABSTRACT

An injection molding machine having a side-injection sub-assembly and a method for providing access to a hot passage distributor system therein. The injection molding machine includes a side-injection sub-assembly having an injection mold part and the hot passage distributor system. The hot passage distributor system is sandwiched between the injection mold part and a head plate by two or more bolt members, which attach the injection mold part to the head plate and are accessible from a side of the injection mold part. The injection molding machine further includes an ejection mold part for releasably mating to the injection mold part and defining a mold cavity.

12 Claims, 7 Drawing Sheets

INJECTION MOLDING MACHINE HAVING A SIDE-INJECTION SUB-ASSEMBLY AND A METHOD FOR ACCESSING A HOT PASSAGE DISTRIBUTOR SYSTEM CONTAINED THEREIN

TECHNICAL FIELD

The present invention relates generally to injection molding machines, and more particularly to an injection molding machine having side-injection sub-assembly that readily allows access to a hot passage distributor system contained therein.

BACKGROUND OF THE INVENTION

Injection molding machines are well known. Typical injection molding machines generally include an injection mold part and an ejection mold part, which together form two tool halves for defining a mold cavity. The injection mold part typically has one or more channels for partially receiving a hot passage distributor system therethrough.

Existing injection molding machines have a construction that is substantially difficult to dismantle for accessing various parts of the machine, e.g. the hot passage distributor system, for maintaining and/or repairing those parts.

Therefore, a need exists for an injection molding machine having a side-injection sub-assembly that is easily manipulated for providing access to components therein.

SUMMARY OF THE INVENTION

The present invention provides an injection molding machine having a side-injection sub-assembly and a method for readily providing access to a hot passage distributor system contained therein. The side-injection sub-assembly includes an injection mold part and a hot passage distributor system. The hot passage distributor system is sandwiched and fixedly held between the injection mold part and a bead plate. Specifically, two or more bolt members attach the injection mold part to the head plate and are accessible from a side of the injection mold part. In that regard, these bolt members can be detached to remove the injection mold part from the hot passage distributor system and provide access thereto. The injection molding machine further includes an ejection mold part for releasably mating to the injection mold part and defining a mold cavity.

One advantage of the present invention is that a side-injection sub-assembly is provided having a construction that allows easy dismantling thereof in substantially few steps.

Another advantage of the present invention is that a method for accessing a hot passage distributor system is provided that renders easy access to the hot passage distributor system for maintenance, repair, or replacement thereof.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of the examples of the invention.

DESCRIPTION OF THE PREFERRED EMBODIMENT

Figure 1:
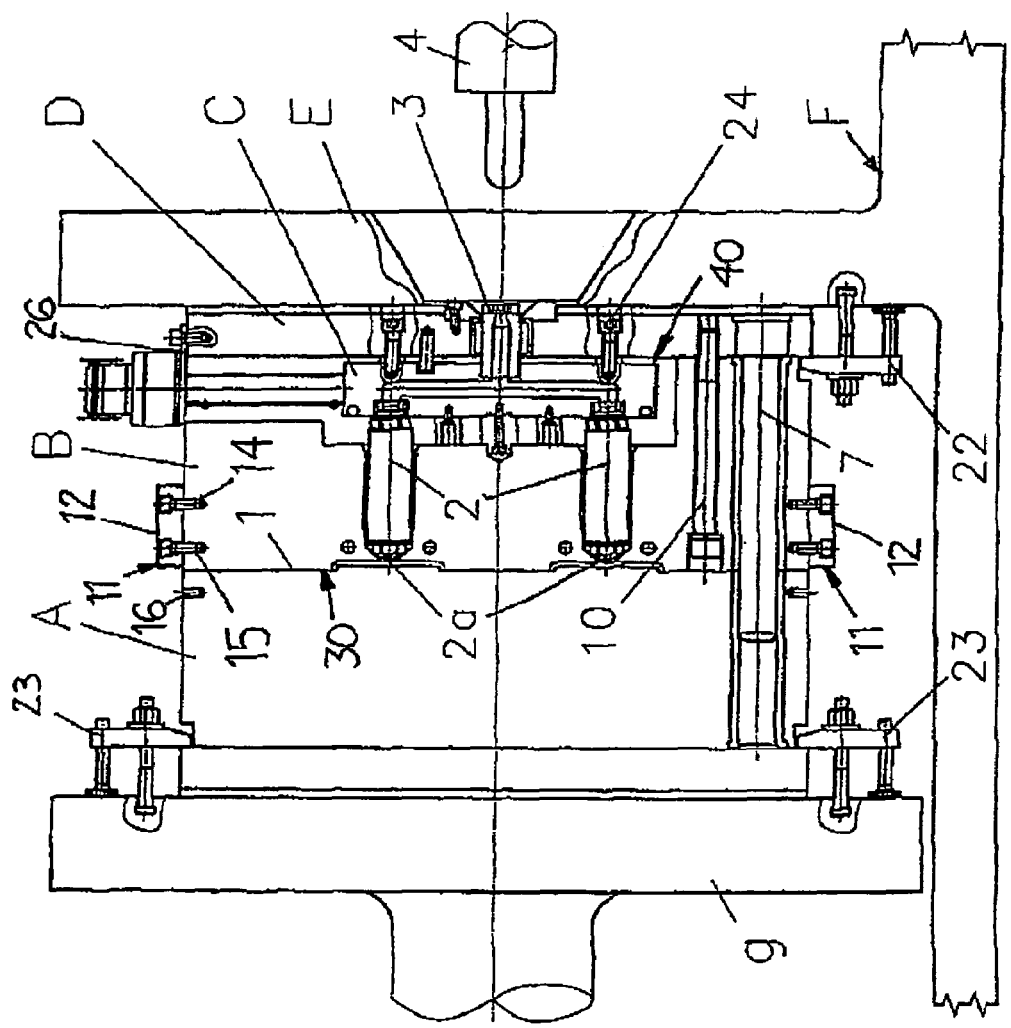
FIG. 1 is a schematic diagram of a side-injection sub-assembly and its mode of installation in an injection molding machine, according to one embodiment of the invention.

In the following figures, the same reference numerals are used to identify the same parts in the various views.

Referring to FIG. 1, there is shown an injection molding machine F having a side-injection sub-assembly 30 installed therein, according to one embodiment of the invention. The injection molding machine F includes an ejection mold part A and an injection mold part B, which are utilized for forming a mold cavity. The ejection mold part A and the injection mold part B have a parting plane 1 therebetween generally indicating the plane of separation between the two tool halves.

The side-injection sub-assembly 30 generally includes the injection mold part B and a hot passage distributor system 40. The hot passage distributor system 40 includes a hot passage distributor block C, two nozzles 2, and a mold-on sleeve 3. It is understood that more or less than two nozzles 2 can be utilized as desired.

The hot passage distributor system 40 has a compact construction with the nozzles 2 fixedly connected thereto. This hot passage distributor system is also ready-wired for connection to the injection molding machine F. In other words, the hot passage distributor system 40 represents a complete unit on which all electrical and hydraulic connections have already been made and which can be tested as is before installation thereof. It is contemplated that the hot passage distributor system 40 can have more or less parts than those enumerated above.

The injection mold part B has two channels 25 formed therein for receiving the nozzles 2 of the hot passage distributor system 40. Each nozzle 2 has a tip opening 2A at one end that protrudes through a gate point into the mold cavity 26. The opposing end of each nozzle 2 is fixedly connected to the hot passage distributor block C. This hot passage distributor block C is coupled to the injection molding machine F by way of the mold-on sleeve 3. Moreover, the hot passage distributor block C is held between the injection mold part B and the head plate D by way of a series of bolt fasteners 10.

The side-injection sub-assembly 30 is fastened to the fixed platform E of the injection molding machine F by means of clamps 22. The exact alignment of the two tool halves A and B is accomplished by guide pins 7, introduced from the head plate D and supported on the fixed platform E of the injection molding machine F.

Figure 2:
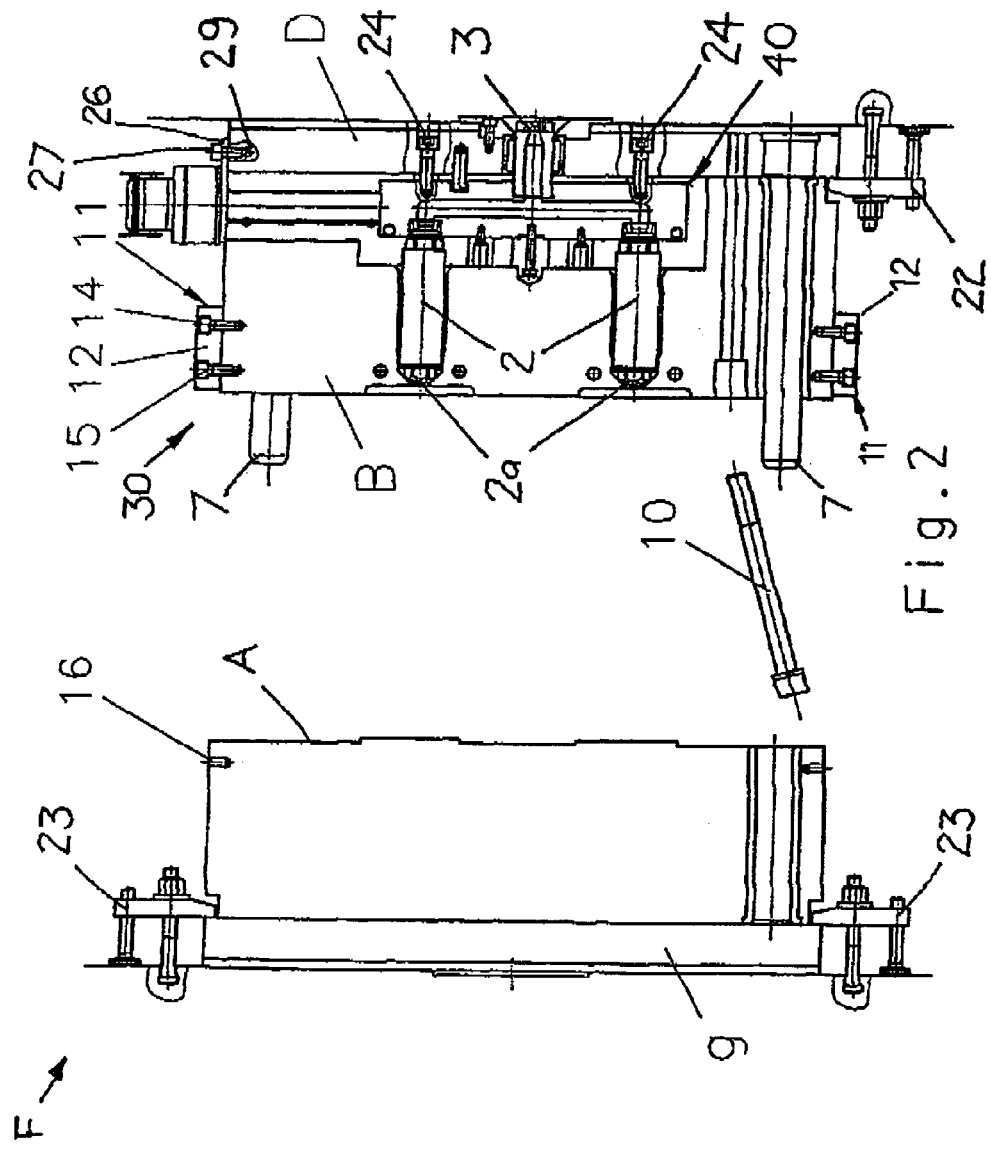
FIG. 2 is a schematic diagram of the injection molding machine and the side-injection sub-assembly of FIG. 1, illustrating first and second steps of a first operation of a method for making accessible a hot passage distributor system contained within the side-injection sub-assembly.

The ejection mold part A is fastened to the movable platform G of the injection molding machine F via clamps 23. Although only two clamps 23 are illustrated, it will be appreciated that more or less than two clamps 23 can be utilized as desired. In this way, the ejection mold part A can travel back and forth (left and right as shown in FIGS. 1 and 2) with the movable platform G thereby respectively opening and closing the mold cavity.

Figure 5:
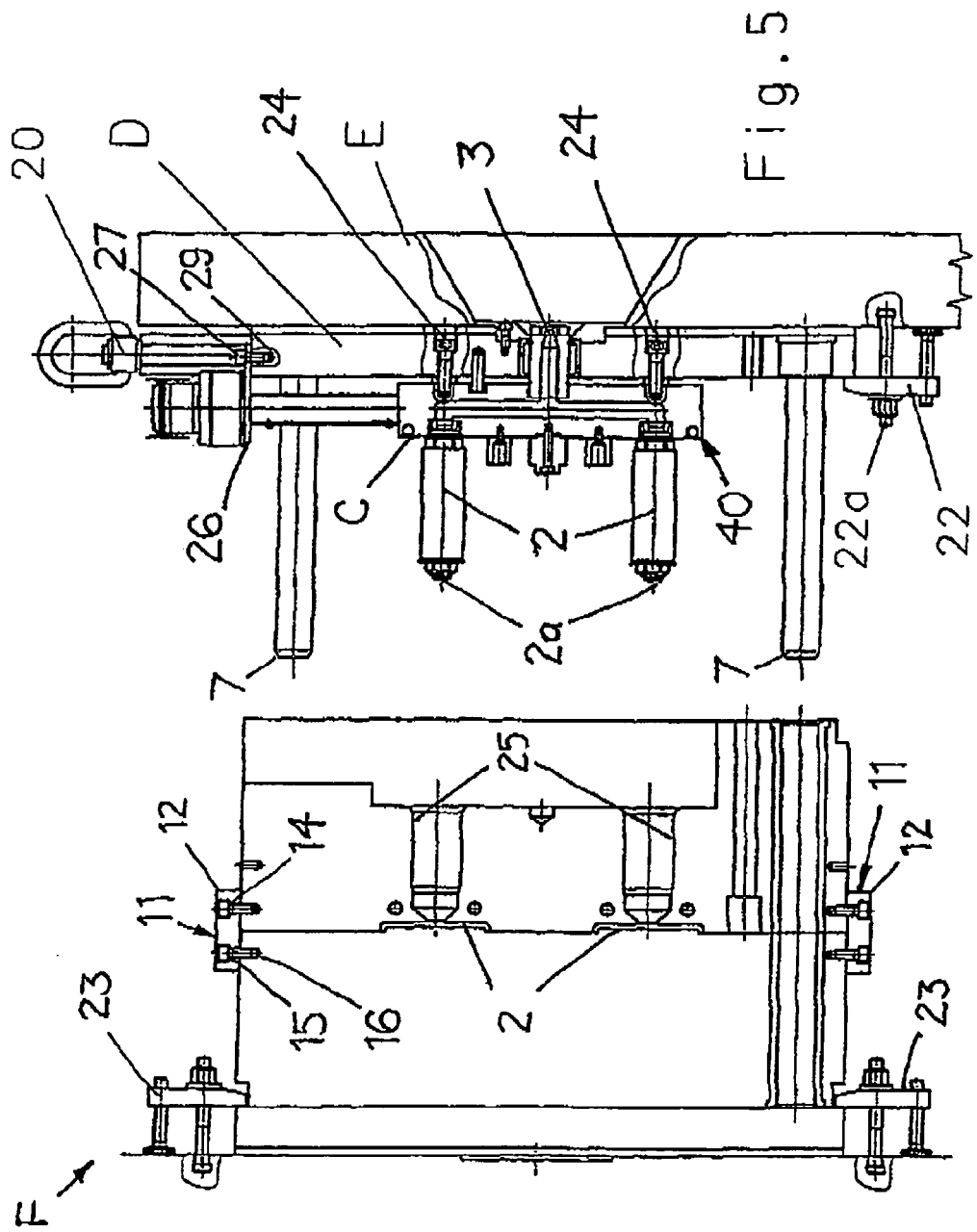
FIG. 5 shows the injection molding machine and the side-injection sub-assembly of FIG. 4, illustrating first and second steps of a second operation of the method initiated in FIGS. 1-4.
Figure 6:
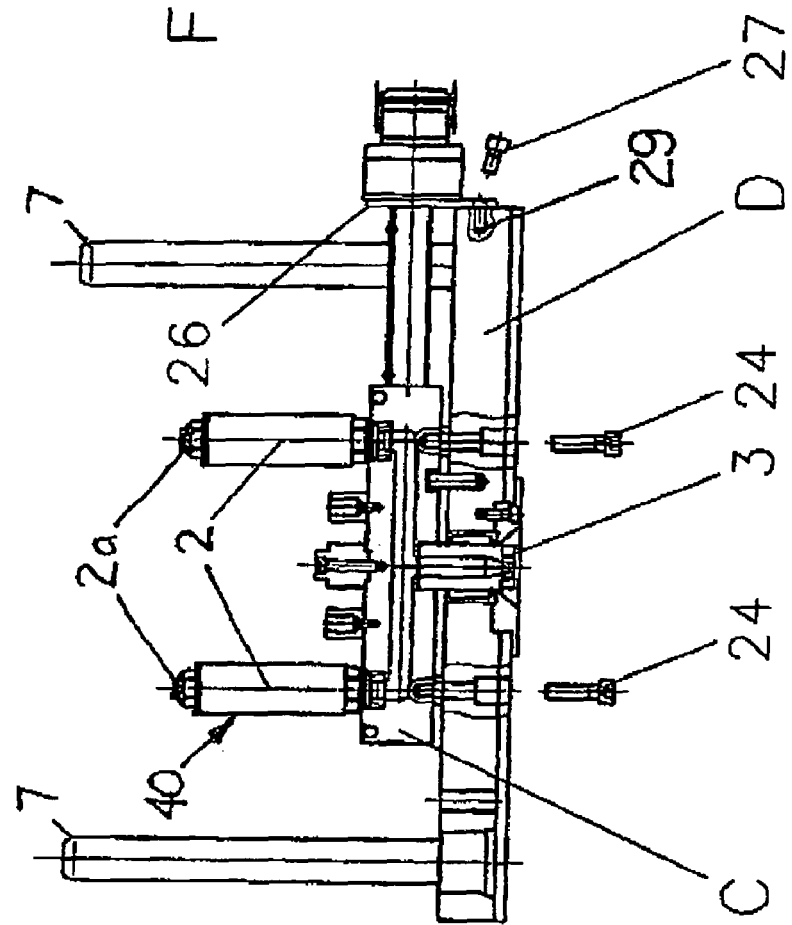
FIG. 6 shows the injection molding machine and the side-injection sub-assembly of FIG. 5, illustrating a third step of the second operation method.

Referring collectively to FIGS. 1-4, there is sequentially shown a first operation of a method for disassembling the injection molding machine F and making the hot passage distributor system 40 partially accessible for maintenance and/or repair. Moreover, FIGS. 5-6 illustrate a second operation of the method, which is in continuation of the first operation. This second method makes the hot passage distributor system 40 completely accessible from all directions for maintenance, repair, and/or other suitable purposes. It will be appreciated that these sequences merely exemplify one method for accessing the hot passage distributor system 40. In this regard, other suitable methods can be utilized with the injection molding machine and side-injection sub-assembly, as exemplified above and otherwise claimed.

With particular attention to FIGS. 1-4, there is sequentially shown the first operation of accessing the hot passage distributor system 40. Also, FIG. 7 shows a logic flow diagram of this method.

Figure 7:
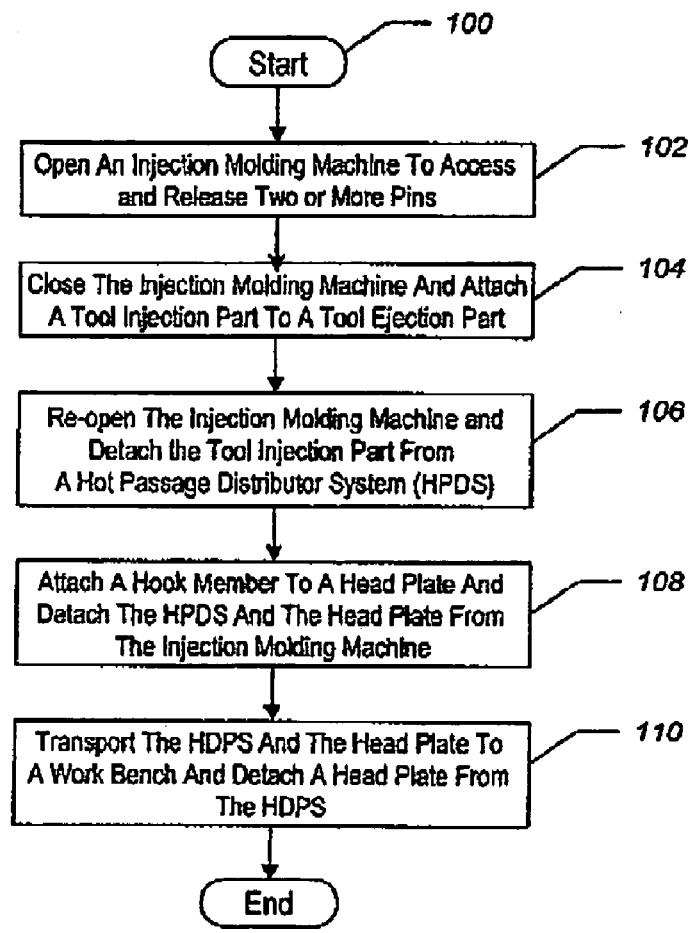
FIG. 7 is a logic flow diagram illustrating the method of FIGS. 1-6.

Referring to FIG. 7, the first operation of the method commences in step 100 and then immediately proceeds to step 102.

In step 102, as depicted in FIGS. 2 and 7, the injection molding machine F is opened. Specifically, the ejection mold part A is moved away from the injection mold part B by moving the movable platform G accordingly. Then, the bolt fasteners 10, which are utilized for attaching the injection mold part B to the head plate D, are released. These bolt fasteners 10 are introduced and made accessible from the side of the injection mold part B. This feature is beneficial over existing side-injection sub-assemblies, which include bolt fasteners introduced from the side of the head plate D, because it provides a construction that can be more readily disassembled.

Furthermore, the head plate D is connected to the hot passage distributor block C via a series of fastening screws 24. This feature allows the hot passage distributor block C to remain attached to the head plate D while the bolt fasteners 10 are released and the injection mold part B is removed from the side-injection sub-assembly 30.

It is understood that existing side-injection sub-assemblies include a positive dynamic connection between the head plate D and the hot passage distributor block C by means of bolts introduced from the head plate D. According to the invention, by contrast, the corresponding bolt fasteners 10 (FIG. 2) are introduced from the side of the tool injection part B and removed in the very first operation method. Then, the sequence proceeds to step 104.

Figure 3:
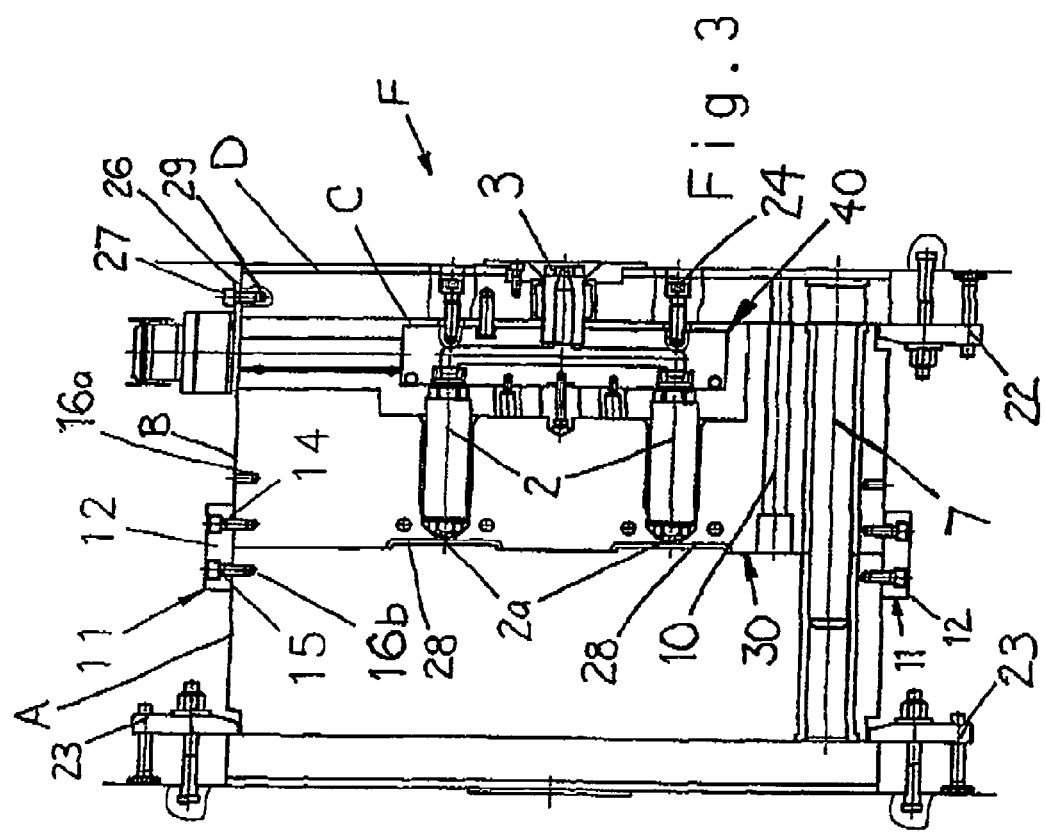
FIG. 3 illustrates the injection molding machine and the side-injection sub-assembly of FIG. 2, illustrating a third step of the first operation method.

In step 104, as illustrated in FIGS. 3 and 7, the tool is closed again. In the closed position, fastening devices 11, e.g. bar members 12, are utilized for receiving screws 14, 15 and attaching the injection mold part B to the ejection mold part A. In particular, screw 15 is unscrewed and removed from a first hole 16a formed within the bar member 12. Then, screw 14 is loosened and the bar member 12 is rotated 180 degrees around screw 14. Next, screw 15 is inserted into a second hole 16b of the bar member 16 and utilized for fixedly attaching the bar member 12 to the ejection mold part A. As a result, the new configuration includes the ejection mold part A being fixedly connected to the injection mold part B. In this regard, the bar member 12 provides a releasable connection between the two tool parts A and B. This feature is beneficial because it eliminates any obstruction typically associated with the injection mold part B being attached to the hot passage distributor system 40.

Each bar member 12 is initially fastened only to the injection mold part B when the bar member 12 is not being utilized to attach the two tool halves A and B together. However, it is understood that the bar member can instead be stored on the ejection mold part A as desired.

It will be appreciated that the fastening device 11 may be of any configuration other than the one hereinbefore exemplified. Then, the sequence proceeds to step 106.

Figure 4:
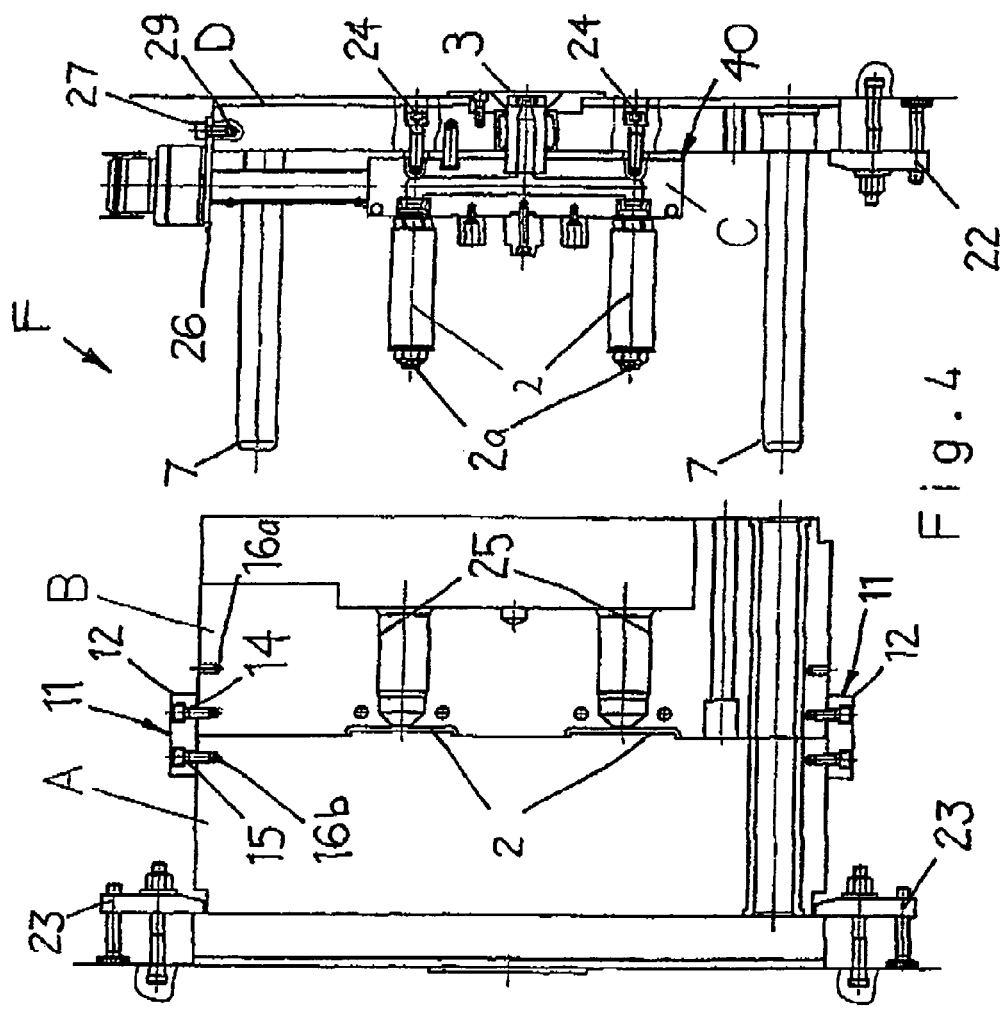
FIG. 4 illustrates the injection molding machine and the side-injection sub-assembly of FIG. 3, illustrating a fourth step of the first operation method.

In step 106, as shown in FIGS. 4 and 7, the injection molding machine F is re-opened by moving the movable platform G away from the injection mold part B. In that way, part A the ejection mold part A is carried with the movable platform G away from the injection mold part B. As a result, the hot passage distributor system 40 with its hot passage distributor block C and the nozzles 2 are accessible from one side for maintenance, repair, or various other purposes.

That completes the first operation of the method of clearing the hot passage distributor system. It will be appreciated that the first operation provides for extensive maintenance opportunities without requiring that the side-injection sub-assembly 30 is completely removed from the injection molding machine F. For example, after completion of the first operation, typical maintenance performed can include replacement of gate caps, gate points, nozzle heating means, nozzle sensors, and distributor sensors, as well as checking electrical devices and inspecting for leakage.

The invention, therefore, after completion of the first operation, allows maintenance of the hot passage distributor system, while the system remains fastened to the injection molding machine.

If no further maintenance work is required, the injection mold part B is moved back over the nozzles 2 again and the hot passage distributor block C. Then, the bar members 12 are replaced to their original positions on the injection mold part B. Also, the injection molding machine F is re-opened, by reinserting the bolt fasteners 10 and utilizing them to re-connect the injection mold part B to the head plate D.

If further maintenance work is required, specifically maintenance on the side of the hot passage distributor system 40 opposite to the nozzles 2, then the first operation is followed by a second operation. This second operation is sequentially shown in FIGS. 5 and 6, as well as in steps 108 and 110 in FIG. 7.

In step 108, as shown in FIGS. 5 and 7, a hook member 20, e.g. an eye hook, is fastened to the head plate D within a threaded hole 29 formed within the head plate D. Thereafter, the hook (not shown) of a crane is attached to the hook member 20. Next, the fastening of the head plate D to the fixed platform E of the injection molding machine F is released by freeing and removing clamps 22 from their threaded shaft 22a. Thereafter, the head plate D and the hot passage distributor system 40 are transported to a workbench. The sequence then proceeds to step 110.

In step 110, as shown in FIGS. 6 and 7, the hot passage distributor system 40 and the head plate D are placed on a workbench. On the workbench, fastening screws 24, which are utilized for attaching the head plate D to the hot passage distributor block C, are removed therefrom. Also, a screw 27, which is utilized for attaching the support flange 26 to the head plate D, is removed therefrom. As a result, the head plate D can be lifted off the hot passage distributor system 40.

Thus, the entire hot passage distributor system 40, consisting of the hot passage distributor block C, the nozzles 2, the mold-on sleeve 3 and the corresponding electrical, pneumatic and hydraulic connections, is omni-laterally accessible for maintenance work or a variety of other purposes. It is understood that the bench service associated with the second operation is possible without breaking the electrical, pneumatic, and hydraulic connections.

In corresponding reverse sequence of the steps of the two operations described, the side-injection sub-assembly is reassembled after completion of maintenance.

While particular embodiments of the invention have been shown and described, numerous variations and alternate embodiments will occur to those skilled in the art. Accordingly, it is intended that the invention be limited only in terms of the appended claims.

What is claimed is:

1. A method of servicing a hot passage distributor system positioned on an injection molding (IM) machine, the IM machine having a moveable platform and a fixed platform, the hot passage distribution system mounted on a head plate on the injection part of the mold and mounted on the fixed platform, and the ejector part of the mold being positioned on the moveable platform, the hot passage distribution system having at least two nozzle members mounted thereon for passage of molten resin material into a cavity in the mold, said method comprising the steps of:

separating the injection and ejector parts of the mold on the IM machine to allow access to first fastening devices which secure the injection part of the mold to the head plate;

removing said first fastening devices;

closing the mold;

fastening together the injection and ejector parts of the mold;

separating the mold from the hot passage distribution system and head plate; and servicing said hot passage distribution system while still mounted on the head plate on the fixed platform.

2. The method as set forth in claim 1, wherein said first fastening devices comprise at least two bolt members.

3. The method as set forth in claim 1, wherein said step of fastening together said injection and ejector parts of the mold comprises attaching a bar member to the two parts of the mold.

4. The method as set forth in claim 3 wherein said bar member is attached to the two parts of the mold by second fastening devices.

5. The method as set forth in claim 4 wherein said second fastening devices comprise at least two bolt members.

6. A method of servicing a hot passage distributor system positioned on an injection molding (IM) machine, the IM machine having a moveable platform and a fixed platform, the hot passage distribution system mounted on a head plate on the injection part of the mold and mounted on the fixed platform, and the ejector part of the mold being positioned on the moveable platform, the hot passage distribution system having at least two nozzle members mounted thereon for passage of molten resin material into a cavity in the mold, said method comprising the steps of:

separating the injection and ejector parts of the mold on the IM machine to allow access to first fastening devices which secure the injection part of the mold to the head plate;

removing said first fastening devices;

closing the mold;

fastening together the injection and ejector parts of the mold;

separating the mold from the hot passage distribution system and head plate; and removing said hot passage distribution system and head plate from said IM machine.

7. The method as set forth in claim 6, wherein said first fastening devices comprise at least two bolt members.

8. The method as set forth in claim 6, wherein said step of fastening together said injection and ejector parts of the mold comprises attaching a bar member to the two parts of the mold.

9. The method as set forth in claim 8, wherein said bar member is attached to the two parts of the mold by second fastening devices.

10. The method as set forth in claim 9, wherein said second fastening devices comprise at least two bolt members.

11. The method as set forth in claim 6 further comprising the step of separating said hot distribution system from said head plate after they are removed from the IM machine.

12. The method as set forth in claim 6 further comprising the step of attaching at least one hook member to the head plate for use in removing said hot passage distribution system and head plate from the IM machine.

* * * * *